C. J. ROY.
GOPHER TRAP.
APPLICATION FILED FEB. 20, 1915.
1,161,891. Patented Nov. 30, 1915.
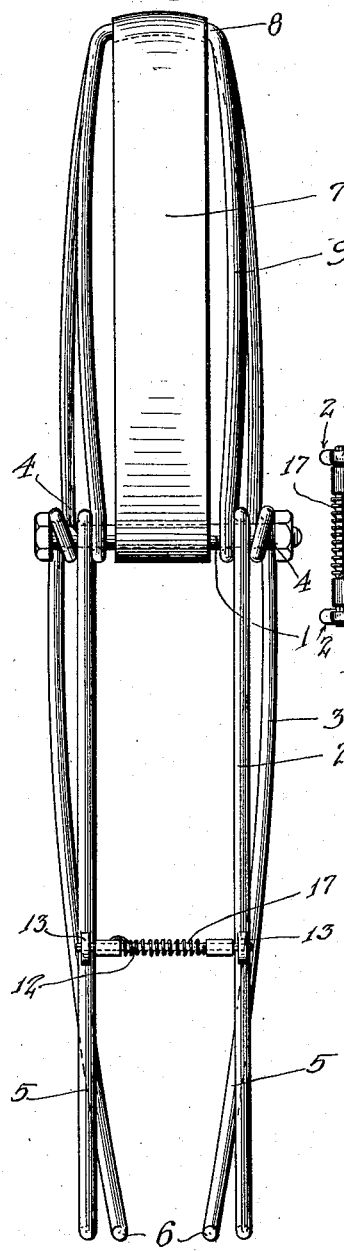
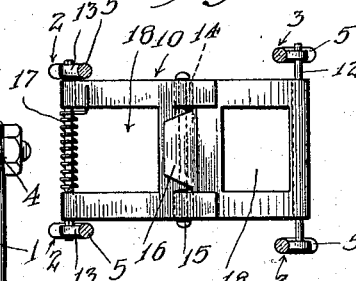
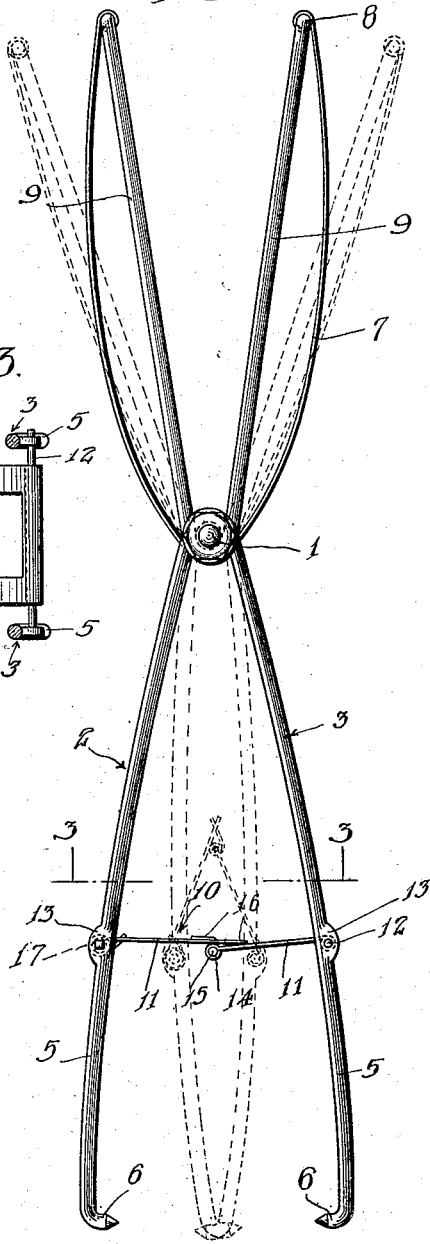
Witnesses:
Inventor
Charles J Roy

UNITED STATES PATENT OFFICE.

CHARLES J. ROY, OF CAJON, CALIFORNIA.

GOPHER-TRAP.

1,161,891.  Specification of Letters Patent.  Patented Nov. 30, 1915.

Application filed February 20, 1915. Serial No. 9,585.

*To all whom it may concern:*

Be it known that I, CHARLES J. ROY, a citizen of the United States, residing at Cajon, in the county of San Bernardino and State of California, have invented a new and useful Gopher-Trap, of which the following is a specification.

This invention relates to traps and is particularly designed for trapping gophers and other small animals.

The primary object of the invention is to provide a trap which is constructed so that when placed within a gopher or other hole the animal will be induced to approach it and will be readily trapped.

Another object of this invention is to provide a trap which may be placed in position in the hole occupied by the animal to be trapped and set after being so positioned without necessitating that the operator place his hand within the hole; there being provided trigger means which will automatically set when the jaws of the trap are moved apart.

Another object of this invention is to provide a trap of the character described that is of simple construction, is inexpensive to manufacture and which may be safely and easily set.

A further object is to generally improve and simplify the structure and operation of traps of the character described so as to render them more practical, efficient and commercially desirable.

Referring to the drawings: Figure 1 is a front elevation of the trap; Fig. 2 is a side elevation showing the trap set; and Fig. 3 is a horizontal sectional view taken on line 3—3 of Fig. 1.

Referring to the drawing by characters of reference, 1 designates the pivot pin to which are pivoted similar trap sections 2 and 3. Each section comprises a single piece of wire bent intermediate its ends to form opposed arms. Each of the arms is twisted intermediate its ends to form an eye 4 and said eyes are mounted on the pivot pin. The portions of the arms which extend from the free ends thereof to the pin form trap jaws 5 and it will be seen that a pair of these jaws is provided by each section. The free ends of jaws are directed inwardly as at 6 and are pointed so as to prevent the animal from escaping. The jaws 5 of the section 3 converge toward their free ends and are arranged to pass between the jaws 5 on the section 1, as shown in Fig. 1 of the drawings.

A flat leaf spring 7 is engaged intermediate its ends with the central portion of the pin 1 and at its ends is rolled about the web portions 8 which join the arms of each of the sections. The portions of the arms of the sections which extend rearwardly of the pivot pin 1 comprise handles 9, and the spring 7 when the trap is set is bent into an approximate U-shape and is extended beyond said handles. Thus it will be seen that the spring tends to hold the jaws 5 in crossed position, as shown in Fig. 1 of the drawings.

The jaws are held in set position by means of a trigger 10 which is arranged between and connected with the jaws at a point considerably spaced from the free ends thereof. This trigger 10 comprises substantially rectangular and preferably flat trigger plates 11 which are pivoted at their outer ends to pins 12 secured to and arranged between the jaws of each section. Each jaw 5 is flattened to provide a bearing 13 for the pin 12 and said pin is preferably constructed so as to be held against rotation when fitted in the bearing 13. The opposed edges of the plates 11 are provided with hinge barrels 14 which aline and receive a hinge pin 15 in the ordinary manner. Projections 16 are carried on the opposed edges of the plates 11 and the projections on one plate overlap and engage with the upper face of the other plate so as to limit the movement of the plates in one direction.

It will be seen that when the handles 9 are compressed, the jaws 5 will be forced apart and the plates 11 of the trigger 10 straightened out relative to one another. In order for the plates of the trigger to hold the jaws spaced it is required that said plates be moved outwardly past the center line relative to their pivotal axes. To accomplish this there is provided a coil spring 17 which is mounted on and secured to the pin 12 for one of the plates 11. One end of this spring 17 is disposed in engagement with the inner face of the adjacent plate 11, thus giving the spring the tendency to force the plates outwardly in past center position as described. After the handles 9 have been compressed to move the jaws 5 apart as far as possible, the action of the spring 17 is had and the plates 11 are forced outwardly as described.

In setting gopher traps it is customary to place them within the gopher hole and by so doing no light is permitted access to the hole. In order to allow the light to penetrate the hole and induce the gopher to come to the entrance opening with a view to covering up said opening, the plates 11 are provided with relatively large openings 18 and it will be seen that the light is permitted to penetrate the gopher hole through these openings 18.

In use the trap is placed within the gopher hole and is then set by compressing the handles 9, the spring 17 acting to automatically set the trigger 10. As the gopher attempts to come to the surface of the ground it will engage the plates 11 of the trigger, and by such engagement will spring the trap and be quickly caught by the jaws 5. The plates 11 are so arranged that only a slight touch is necessary to provide for the springing of the trap and as the sets of jaws 5 are opposite to one another and practically surround the gopher, possibility of the gopher escaping is practically eliminated. Some gopher holes are not vertical but extend at an angle and some force other than gravity is necessary to provide for the setting of the trigger. For this reason the spring 17 is provided and the trigger is positively set when the handles 9 are compressed and the jaws forced apart.

In practice I have found that the form of my invention illustrated in the drawings and referred to in the above description as the preferred embodiment is the most efficient and practical, yet realizing that the conditions concurrent with the adoption of my device will necessarily vary, I desire to emphasize the fact that various minor changes in construction, proportions and arrangement of parts may be resorted to when required without sacrificing any of the advantages of my invention as set forth in the appended claims.

What I claim is:

1. A gopher trap comprising pivoted jaws, trigger means located between the jaws to hold them apart comprising plates hinged to the jaws and to one another, a spring adapted to move the plates into set position when the jaws are forced apart, and means to force the jaws together when the trigger means is sprung.

2. A gopher trap comprising pivoted jaws, trigger means located between the jaws to hold them apart comprising plates hinged to the jaws and to one another, a spring adapted to move the plates into set position when the jaws are forced apart, and means to force the jaws together when the trigger means is sprung, said plates having relatively large openings therein to permit light to penetrate the gopher hole, in which the trap is placed.

3. A gopher trap comprising crossed jaws pivoted to one another and having prongs on certain ends thereof, a trigger located between and adapted to hold the jaws apart, said trigger comprising plates hinged to the jaws and to one another, spring means connected with the jaws above the pivot point thereof tending to force the jaws together when the trigger is sprung, and a spring to automatically move the plates into set position when the jaws are forced apart.

4. A gopher trap comprising jaws pivoted to one another and having prongs on certain ends thereof, a trigger located between and adapted to hold the jaws apart, said trigger comprising plates hinged to the jaws and to one another, spring means connected with the jaws above the pivot point thereof tending to force the jaws apart when the trigger is sprung, a spring to automatically move the plates into set position when the jaws are forced apart, said last named spring means adapted to move the plates below the horizontal to cause them to be set, and means to limit the movement of the jaws to a point past the horizontal.

5. A gopher trap comprising pivoted jaws, prongs on the ends of the jaws, trigger means for holding the jaws apart, said trigger means connected with each jaw and extending across the space between the jaws at a point between the pivot point and prongs, means to force the jaws together when the trigger means is sprung, and a spring connected with one of the jaws and with the trigger means for automatically setting the trigger means when the jaws are forced apart.

In testimony whereof, I have hereunto set my hand at Los Angeles, California, this 10th day of February, 1915.

CHARLES J. ROY.

In presence of—
ANNA F. SCHMIDTBAUER,
LORA M. BOWERS.

Copies of this patent may be obtained for five cents each, by addressing the "Commissioner of Patents, Washington, D. C."